United States Patent [19]

Smith et al.

[11] Patent Number: 5,581,133
[45] Date of Patent: Dec. 3, 1996

[54] COMBINATION TRANSFER AND BYPASS ISOLATION SWITCH UTILIZING DRAWOUT PROTECTIVE DEVICES AND KEY INTERLOCKS

[75] Inventors: George A. Smith, N. Huntingdon Twp., Westmoreland County; Thomas K. Fogle, Pittsburgh, both of Pa.; Larry S. Lakes, Tyner, Ky.

[73] Assignee: Eaton Corporation, Cleveland, Ohio

[21] Appl. No.: 168,965

[22] Filed: Dec. 17, 1993

[51] Int. Cl.⁶ ......................................................... H02J 7/00
[52] U.S. Cl. ........................... 307/64; 200/50.09; 307/85; 361/615
[58] Field of Search ................................. 307/64, 66, 43, 307/85–87; 200/50 R, 50 A, 50 AA, 50 C, 50.01, 50.02, 50.09, 50.11, 50.32, 50.21, 50.28, 50.12; 361/605, 606, 607, 608, 615

[56] References Cited

U.S. PATENT DOCUMENTS

| | | | |
|---|---|---|---|
| 4,240,053 | 12/1980 | Nelson et al. | 335/16 |
| 4,295,053 | 10/1981 | Kovatch et al. | 307/64 |
| 4,351,013 | 9/1982 | Matsko et al. | 361/96 |
| 4,423,336 | 12/1983 | Iverson et al. | 307/64 |
| 4,565,908 | 1/1986 | Bould | 200/50 |
| 5,023,469 | 6/1991 | Bassett et al. | 307/64 |
| 5,081,367 | 1/1992 | Smith et al. | 307/64 |
| 5,200,586 | 4/1993 | Smith et al. | 200/50 C |

OTHER PUBLICATIONS

Westinghouse Transfer Switch Equipment (Type ATSBI Combination Bypass Isolation and Automatic Transfer Switches); Jun. 1991; London, KY 40741; pp. 1–8.

Westinghouse Transfer Switch Equipment (Type ATSRD Drawout Transfer Switches); Aug. 1991; London, KY 40741; pp. 1–8.

Kohler Transfer and Bypass Isolation Switches; 1983; Kohler, WI 53044; pp. 1–20.

Zenith ZBTS Bypass-Isolation Transfer Switches; Sep. 1988; Chicago, IL 60609; pp. 1–4.

Russelectric Power Control Systems (Bypass/Isolation Switches); Jul. 1987; Hingham, MA 02043; pp. 1–4.

Primary Examiner—William M. Shoop, Jr.
Assistant Examiner—Jonathan S. Kaplan
Attorney, Agent, or Firm—Martin J. Moran

[57] ABSTRACT

An apparatus selectively connects a normal power line and an emergency power line to a load, and includes two interlocked switching mechanisms, each having individual interlocks, for selectively connecting the power lines to the load, and an interlock mechanism for interlocking the switching mechanisms in order that only one of the power lines at a time is connected to the load. The switching mechanisms may each have two drawout cassettes including associated switching devices for switching the power lines to the load and, also, including an isolated position for isolation of the associated switching device from at least one of the switched power lines and the load. Each switching device may be a circuit breaker having a trip unit for sensing current flowing from a power line to the load and tripping the circuit breaker. The interlock mechanisms may include keylock mechanisms which selectively disable closing of the switching devices. Each keylock mechanism may have individual locks on associated cassettes and a single key for operating only one of the locks. The individual interlocks of the switching mechanisms may cooperate with the keylock mechanisms to selectively disable connection of a power line to the load. Each key may be retained by an unlocked associated lock and may be removed from a locked associated lock.

6 Claims, 8 Drawing Sheets

COMBINATION TRANSFER AND BYPASS ISOLATION SWITCH UTILIZING DRAWOUT PROTECTIVE DEVICES AND KEY INTERLOCKS

BACKGROUND OF THE INVENTION

1. Field of the Invention

This invention is directed to a combination transfer and bypass isolation switch using switching devices, and more particularly to such a switch using two interlocked drawout circuit interrupters for transfer switch operation, two interlocked drawout circuit interrupters for bypass operation, and key interlocks for each circuit interrupter.

2. Background of Information

Transfer switches are well known in the art. Transfer switches operate, for example, to transfer a power consuming load from a circuit with a normal power supply to a circuit with an emergency power supply. Applications for transfer switches include stand-by applications, among others, in which the emergency power supply stands-by if the normal power supply should fail. Generally, a transfer switch selects either a normal primary power line or an emergency backup power line for connection with the load. The transfer switch typically comprises a pair of circuit interrupters combined with a drive mechanism, a linkage mechanism and a selection mechanism.

The drive and linkage mechanisms may either be mechanical or electrical. In mechanical systems, usually motors are preferred, but at other times, there is a clear preference for manually-operated drive mechanisms. In either type of mechanical system, the linkage mechanism extends from the drive mechanism to handles of the circuit interrupters. The linkage mechanism couples the drive mechanism with the handles in order that drive force is translated into position changes between progressive positions of the handles. These forces open one circuit interrupter and close the other circuit interrupter. In electrical systems, a first electrical signal is provided to open one circuit interrupter and a second electrical signal is provided to close the other circuit interrupter.

The selection mechanism may either be automatic or manual. In automatic systems, the transfer switch senses the voltages of the normal power line and the emergency power line. Whenever the normal voltage drops below a first predetermined value, and the emergency voltage is above a second predetermined value, the normal power line is disconnected from the load and the emergency power line is connected to the load. Otherwise, whenever the normal voltage is above the second predetermined value, the normal power supply is reconnected (or remains connected) to the load independent of the state of the emergency voltage. Thus, there is a preference for the normal power line. Connection and disconnection are accomplished by the drive and linkage mechanisms. In manual systems, for example, an operator opens the normal circuit interrupter and closes the emergency circuit interrupter.

Bypass switches are also well known in the art. Bypass switches operate, for example, to transfer a power consuming load from a first circuit interrupter to a parallel-connected second circuit interrupter. Bypass switches are used with either a normal power supply or an emergency power supply. Applications for bypass switches include stand-by applications, among others, in which the bypass circuit interrupter stands-by if the normal circuit interrupter requires maintenance or is otherwise unavailable for operation. In such applications, interlocks between bypass and normal circuit interrupters are not required because both circuit interrupters connect the identical power line to the same load.

When bypass switches are used with transfer switches, additional isolation and interlocking mechanisms are required to prevent the simultaneous connection of a normal power line and an emergency power line. These power lines have similar, but different, voltages, frequencies and phases, and thus, a connected power line must be disconnected before the other power line is connected. An isolation mechanism selectively disconnects or isolates transfer switching devices from the power lines and the load. The isolation mechanism also enables selection of an appropriate bypass switching device. The combined system of transfer switches, bypass switches and the isolation mechanism typically comprises seven circuit interrupters and associated interlocking mechanisms. In such combined system, two circuit interrupters are used for transfer switching, two circuit interrupters are used for bypass switching, and three circuit interrupters are used for isolation.

The interlocking mechanisms cooperate with the seven circuit interrupters to ensure that the normal and emergency power lines are not interconnected. The interlocking mechanisms, for example, enable closing of a bypass circuit interrupter whenever the isolation circuit interrupters are open. On the other hand, the isolation circuit interrupters must be closed in order to connect a selected power line to the load using the transfer circuit interrupters. Such interlocking mechanisms typically comprise three locks having a single key. Each lock has a locked position to disable closing of a circuit interrupter and an unlocked position to enable closing of the circuit interrupter. Typically, a first lock is used on the bypass normal circuit interrupter, a second lock is used on the bypass emergency circuit interrupter and a third lock is used for the three isolation circuit interrupters. The three isolation circuit interrupters also have a common linkage, enabled and disabled by the third lock, for simultaneously opening or closing the three isolation circuit interrupters.

There remains a need, therefore, for an improved combination transfer and bypass isolation switch for normal and emergency power lines that minimizes the required number of circuit interrupters.

SUMMARY OF THE INVENTION

This and other needs are satisfied by the invention which is directed to a combination transfer and bypass isolation switch using two interlocked circuit interrupters for transfer switch operation, two interlocked circuit interrupters for bypass switch operation, and key interlocks on each circuit interrupter. In accordance with the invention, for use with a normal power line and an emergency power line, a transfer switch having two interlocked circuit interrupters selectively connects a load to only one of the power lines. A normal circuit interrupter is closed to connect the normal power line to the load. Similarly, an emergency circuit interrupter is closed to connect the emergency power line to the load. The transfer switch also has mechanical interlocks between the normal and emergency circuit interrupters. The interlocks prevent the emergency circuit interrupter from closing when the normal circuit interrupter is closed and prevent the normal circuit interrupter from closing when the emergency circuit interrupter is closed.

A bypass switch having two interlocked circuit interrupters is connected in parallel with the transfer switch and selectively connects the load to only one of the power lines. A bypass normal circuit interrupter is closed to connect the normal power line to the load. Similarly, a bypass emergency circuit interrupter is closed to connect the emergency power line to the load. The bypass switch also has mechanical interlocks between the bypass normal and bypass emergency circuit interrupters. These interlocks of the bypass switch operate in a comparable manner as the mechanical interlocks of the transfer switch described above.

A first key interlock mechanism interlocks operation of the normal (transfer) and bypass emergency circuit interrupters. A second key interlock mechanism interlocks operation of the emergency (transfer) and bypass normal circuit interrupters. The key interlock mechanisms provide an effective interlock between transfer switch and bypass switch functions. Each key interlock mechanism includes a lock on each circuit interrupter and a single key. Each lock has a locked and an unlocked position. Only when a lock is locked, which prevents an associated circuit interrupter from closing, may the key be removed. On the other hand, whenever a lock is unlocked, which permits an associated circuit interrupter to be closed, the key is retained by the lock. Each lock also cooperates with the associated mechanical interlock. For example, whenever the emergency circuit interrupter is open and the normal circuit interrupter is unlocked, the normal circuit interrupter may be closed. Otherwise, when the emergency circuit interrupter is closed or when the normal circuit interrupter is locked, the normal circuit interrupter cannot be closed.

In one embodiment of the invention, the transfer and bypass switches, for maintenance reasons, have drawout circuit interrupters which may be isolated from the power lines and the load of the associated transfer or bypass switch.

It is an object of the invention to provide a transfer and bypass isolation switch using a minimum number of four interlocked switching devices, in which two switching devices are used for transfer operation, two switching devices are used for bypass operation, and in which interlocks prevent the interconnection of the normal and emergency power lines.

It is also an object of the invention to provide a transfer and bypass isolation switch using drawout circuit interrupters for isolation from an associated power line and load by removal or drawout of a bypassed circuit interrupter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
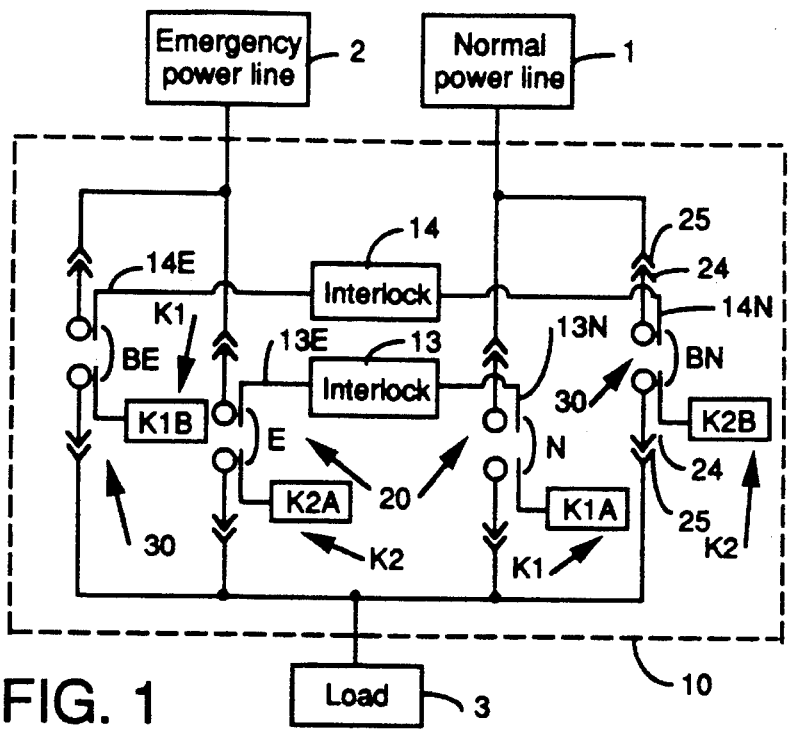
FIG. 1 is a schematic diagram of an embodiment of the invention.

FIG. 1 illustrates a combination transfer and bypass isolation switch 10 for connecting only one of a normal power line 1 and an emergency power line 2 to a load 3. In the exemplary embodiment, transfer switch 20 includes interlocked circuit breakers N,E and bypass switch 30 includes interlocked circuit breakers BN,BE. The transfer switch 20 selectively connects the load 3 to only one of the power lines 1,2. The power lines 1,2 are three phase AC power lines having a fourth neutral line (see FIG. 3) and the circuit breakers N,E,BN,BE are four-pole devices for switching the three phase AC power and neutral lines. It being understood that the invention is applicable to any type of power line, or any type of switching device, having any number of phases, or poles, respectively.

A typical example of a circuit breaker may be found in U.S. Pat. No. 4,240,053 issued Dec. 16, 1980 to Hugh A. Nelson et at. entitled "Circuit Breaker Utilizing Improved Current Carrying Conductor System" and assigned to the assignee of the present invention, which is herein incorporated by reference.

In the exemplary embodiment of FIG. 1, each of the circuit breakers N,E,BN,BE has a trip unit 110 (see FIG. 4) which senses current flowing from the associated power line to the load 3, generates a time-current parameter, and trips the circuit breaker open in the event various predetermined time-current trip characteristics are exceeded. A typical example of a trip unit for a circuit breaker may be found in U.S. Pat. No. 4,351,013 issued Sep. 21,1982 to Joseph J. Matsko et al. entitled "Circuit Interrupter with Multiple Display and Parameter Entry Means" and assigned to the assignee of the present invention, which is herein incorporated by reference. It being understood that the invention is applicable to other types of circuit interrupters not having a trip unit (e.g., a molded case switch).

The normal circuit breaker N of FIG. 1 is closed to connect normal power line 1 to load 3. Similarly, the emergency circuit breaker E is closed to connect emergency power line 2 to load 3. A mechanical interlock 13 of transfer switch 20, having normal interlock 13N and emergency interlock 13E, interlocks circuit breakers N and E, respectively. Emergency interlock 13E prevents emergency circuit breaker E from closing when normal circuit breaker N is closed. Similarly, normal interlock 13N prevents normal circuit breaker N from closing when emergency circuit breaker E is closed.

The bypass switch 30, which is connected in parallel with transfer switch 20, also selectively connects the load 3 to only one of the power lines 1,2. A bypass normal circuit breaker BN is closed to connect normal power line 1 to load 3. Similarly, bypass emergency circuit breaker BE is closed to connect emergency power line 2 to load 3. A mechanical interlock 14,14N,14E of bypass switch 30 interlocks circuit breakers BN,BE and operates in a like manner as mechanical interlock 13,13N,13E of transfer switch 20 described above.

The transfer and bypass switches 20,30 also have key interlock mechanisms K1 and K2 for interlocking operation of circuit breakers N,BE and E,BN, respectively. The key interlock mechanisms K1,K2 include locks K1A,K1B,K2A, K2B on circuit breakers N,BE,E,BN, respectively. The key interlock mechanisms K1 and K2 each include a single key 251 and 261 (see FIG. 2), respectively. Each lock has a locked position, which prevents the associated circuit breaker from closing, and an unlocked position. Each lock permits an associated key to be removed in the locked position. On the other hand, each lock retains the associated key in the unlocked position. Each lock also cooperates with an associated mechanical interlock. For example, whenever emergency circuit breaker E is open and lock K1A of normal circuit breaker N is unlocked, the normal circuit breaker may be closed. Otherwise, when emergency circuit breaker E is closed or when lock K1A is locked, normal circuit breaker N cannot be closed. The remaining locks K1B,K2A,K2B operate in a manner similar to the operation of lock K1A.

In the exemplary embodiment of FIG. 1, each circuit breaker has terminals 24,25 that are part of a drawout mechanism or cassette 22 (see FIG. 2) for isolating the circuit breaker from the power lines and load of the associated transfer or bypass switch. When terminals 24 are separated from terminals 25, circuit breaker BN, for example, is isolated from normal power line 1 and load 3. A typical example of a drawout cassette circuit interrupter may be found in U.S. Pat. No. 4,565,908 issued Jan. 21, 1986 to Fred Bould entitled "Drawout Switchgear Apparatus with Retractable Shutter Mechanism for Terminal Stabs" and assigned to the assignee of the present invention, which is herein incorporated by reference. It being understood that the invention is applicable to other types of circuit interrupters, switches or breakers not having drawout or isolation mechanisms.

Figure 1A:
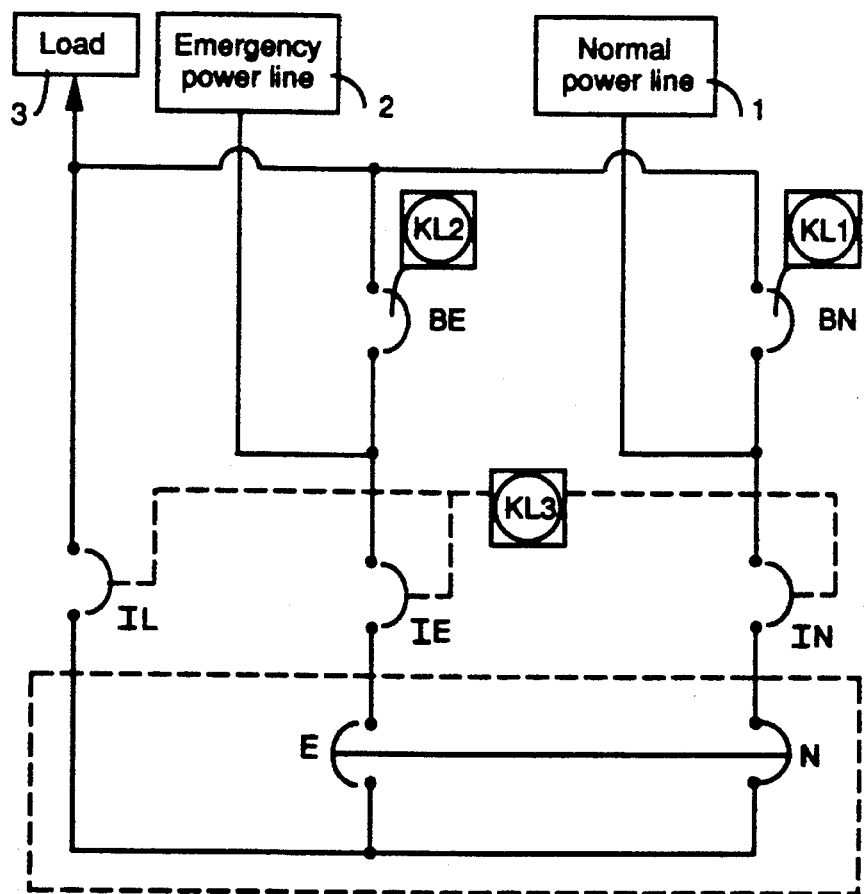
FIG. 1a is a schematic diagram of a prior art transfer and bypass mechanism.

Referring now to FIG. 1a, a schematic diagram of a prior art transfer and bypass mechanism is illustrated. A transfer switch 20A, having normal (transfer) circuit breaker N and emergency (transfer) circuit breaker E, cooperates with three isolation circuit breakers IN,IE,IL in order to selectively connect only one of normal power line 1 and emergency power line 2 to load 3. Whenever normal circuit breaker N and isolation circuit breakers IN and IL are closed, then normal power line 1 is connected to load 3. Similarly, when emergency circuit breaker E is closed and isolation circuit breakers IE and IL are closed, then emergency power line 2 is connected to load 3. The normal circuit breaker N and emergency circuit breaker E are interconnected by a common linkage, in a break before make configuration that is well known in the art, in order that only one of the circuit breakers is closed at a time. A bypass normal circuit breaker BN and a bypass emergency circuit breaker BE selectively connect only one of normal power line 1 and emergency power line 2, respectively, to load 3.

The bypass normal circuit breaker BN, the bypass emergency circuit breaker BE and the interlock circuit breakers IN,IE,IL each have respective key interlock mechanisms KL1,KL2,KL3 for locking operation of these five circuit breakers. The key interlock mechanisms KL1,KL2,KL3 generally have a single key (not shown) for operating the mechanisms. In particular, the isolation circuit breakers IN,IE,IL must first be jointly opened by the common linkage and, then, must be jointly locked by locking mechanism KL3 before either of the bypass circuit breakers BN,BE may be closed. Thus, for example, after locking mechanism KL3 is locked, the single key may be removed and used to unlock locking mechanism KL1, and bypass circuit breaker BN may be closed to connect load 3 to normal power line 1. No key interlock mechanism is provided for normal circuit breaker N and emergency circuit breaker E. These circuit breakers are isolated from the power lines 1,2 and the load 3 by isolation circuit breakers IN,IE,IL which remain locked in an open position by locking mechanism KL3.

Figure 2:
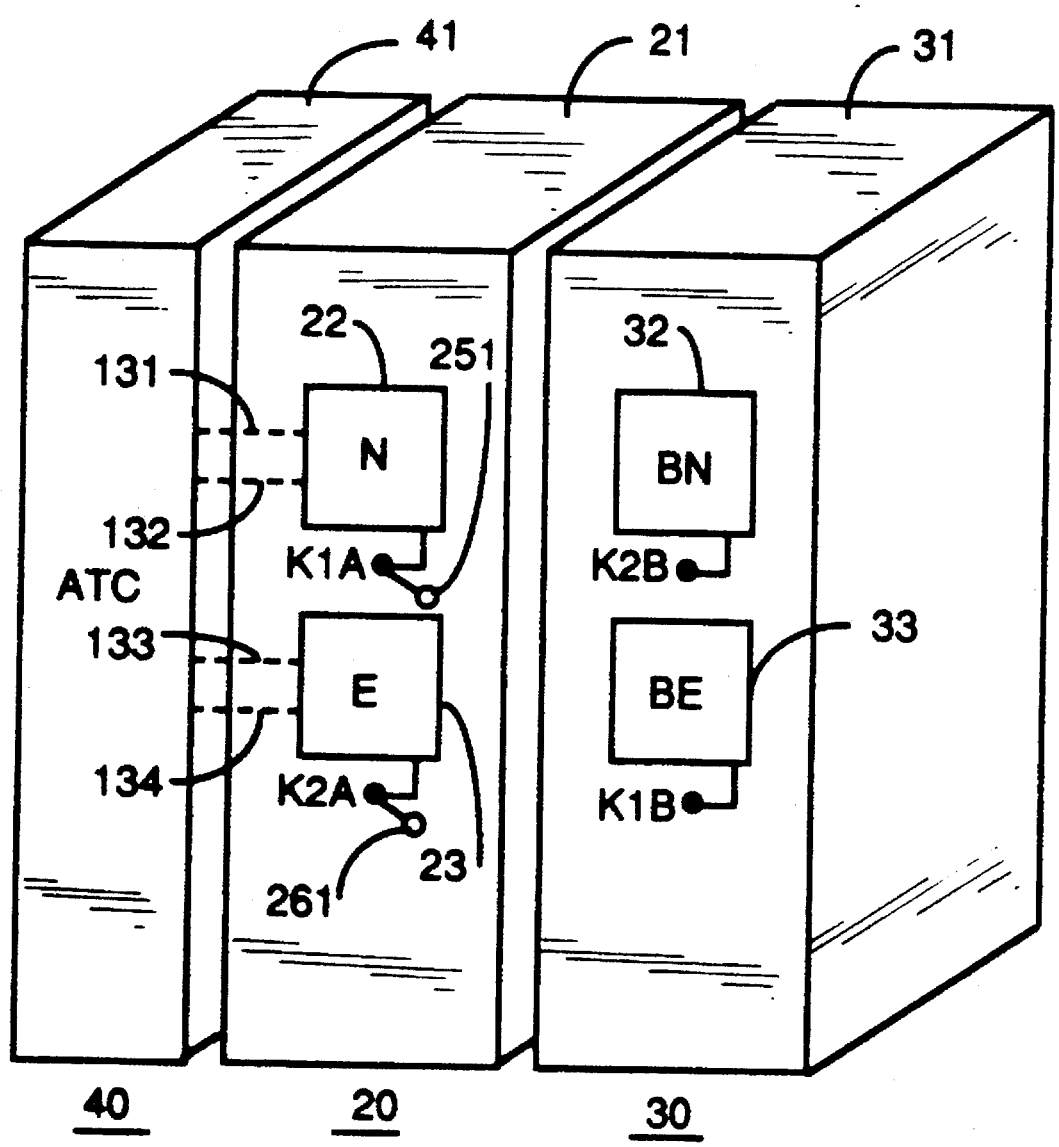
FIG. 2 is a perspective view of another embodiment of the invention having four drawout switching devices and automatic transfer circuitry for two of the devices.

Referring now to FIG. 2, transfer switch 20 is mounted in steel enclosure 21, bypass switch 30 is mounted in steel enclosure 31 and automatic transfer circuitry (ATC) 40 is mounted in steel enclosure 41. In the exemplary embodiment, ATC 40 controls opening and closing of normal circuit interrupter N and emergency circuit interrupter E over control lines 131-134 (see FIG. 6). An example of automatic transfer in an uninterruptable power supply may be found in U.S. Pat. No. 5,081,367 issued Jan. 14, 1992 to George A. Smith et al. entitled "Electric Power System with Maintenance Bypass for Uninterruptable Power Supply Using Closed Transition Operation" and assigned to the assignee of the present invention, which is herein incorporated by reference.

Each of the drawout cassettes 22,23,32,33 of FIG. 2 includes a circuit interrupter N,E,BN,BE, respectively, which may be isolated from its associated power lines and load. The circuit interrupters include key interlock mechanisms K1A,K2A, K2B,K1B, respectively.

Figure 3:
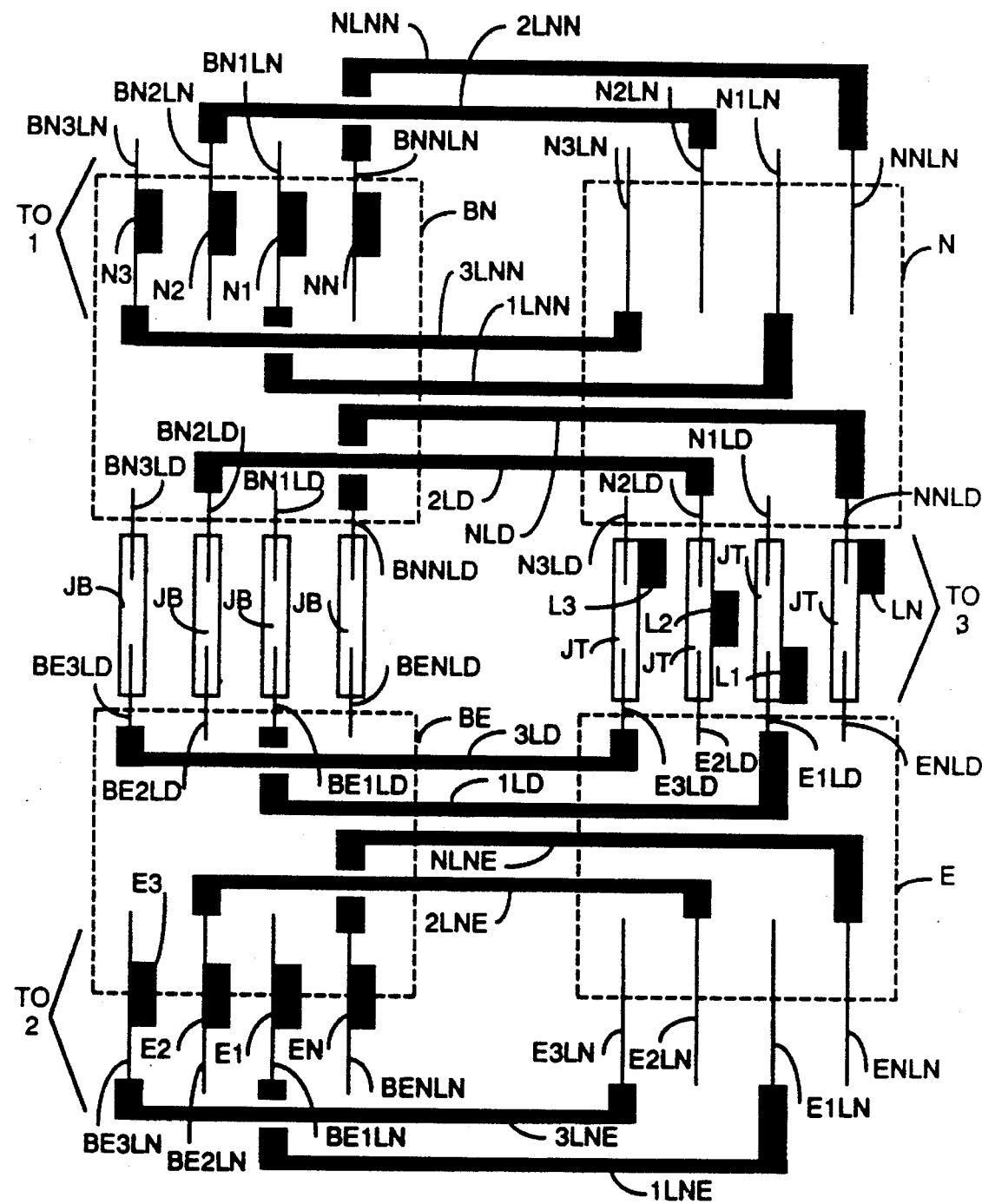
FIG. 3 is a schematic of power interconnections and power terminations of an embodiment of the invention having four switching devices, an emergency power line and a normal power line, the power lines each having three phases and a neutral.

Referring now to FIG. 3, a schematic diagram illustrates power interconnections and power terminations of an embodiment of the invention including emergency and normal power lines which each have three phases and a neutral. In particular, four terminals NN,N1,N2,N3 are provided for the neutral and three phases of normal power line 1. In a like manner, four terminals EN,E1,E2,E3 are provided for the neutral and three phases of emergency power line 2, and four terminals LN,L1,L2,L3 are provided for the neutral and three phases of load 3. Four jumpers JT interconnect load side terminals N3LD,N2LD,N1LD,NNLD of normal circuit breaker N with load side terminals E3LD, E2LD,E1LD,ENLD of emergency circuit breaker E. Similarly, four jumpers JB interconnect load side terminals BN3LD,BN2LD,BN1LD,BNNLD of bypass normal circuit breaker BN with load side terminals BE3LD,BE2LD, BE1LD,BENLD of bypass emergency circuit breaker E.

Load power busses 3LD, 2LD, 1LD, NLD interconnect the load terminals of transfer circuit breakers N,E with the respective load terminals of bypass circuit breakers BN,BE. In a comparable manner, normal line power busses 3LNN, 2LNN, 1LNN,NLNN interconnect the line terminals of normal circuit breaker N with the respective line terminals of bypass normal circuit breaker BN. Emergency line power busses 3LNE,2LNE, 1LNE,NLNE interconnect the line terminals of emergency circuit breaker E with the respective line terminals of bypass emergency circuit breaker BE. Those skilled in the art will appreciate that the terminals, jumpers and power busses are selected in accordance with the rated voltage and current carrying capacity of the circuit breakers.

Figure 4:
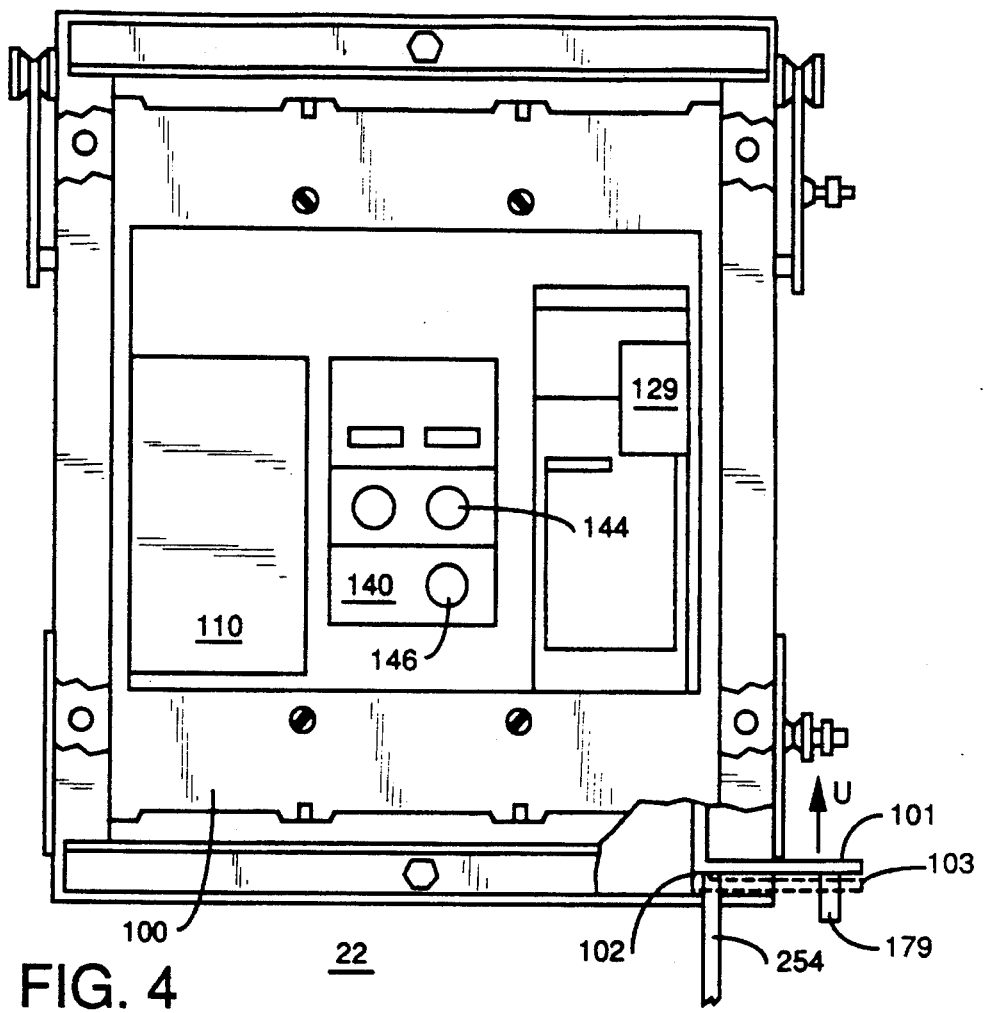
FIG. 4 is a front view of a drawout mechanism or cassette including a switching device having a trip unit and a mechanical interlock for disabling closing of the device.

Referring now to FIG. 4, a front view of drawout cassette 22 is illustrated. A switching device 100 of drawout cassette 22 includes a trip unit 110, an operator interface 140 having an open pushbutton 146 for opening the device, a close pushbutton 144 for closing the device, a charging handle 129 for manually charging a switching mechanism (not shown), and a mechanical L-shaped interlock 101 for disabling closing of the device. A vertical rod 254 engages the L-shaped interlock 101 near bend 102. Whenever rod 254 (see FIG. 5b) forces interlock 101 in upward direction U, a trip bar or lever (not shown) of switching device 100 rotates and disables latching of the switching device in a closed position. The interlock 101 is mechanically biased to assume a lower position 103 (shown in shadow) whenever rod 254 or roller 179 (see FIG. 4c) do not force the interlock in direction U. Thus, when rod 254 and roller 179 are not in place, interlock 101 assumes lower position 103, and switching device 100 may be closed.

Figure 4A:
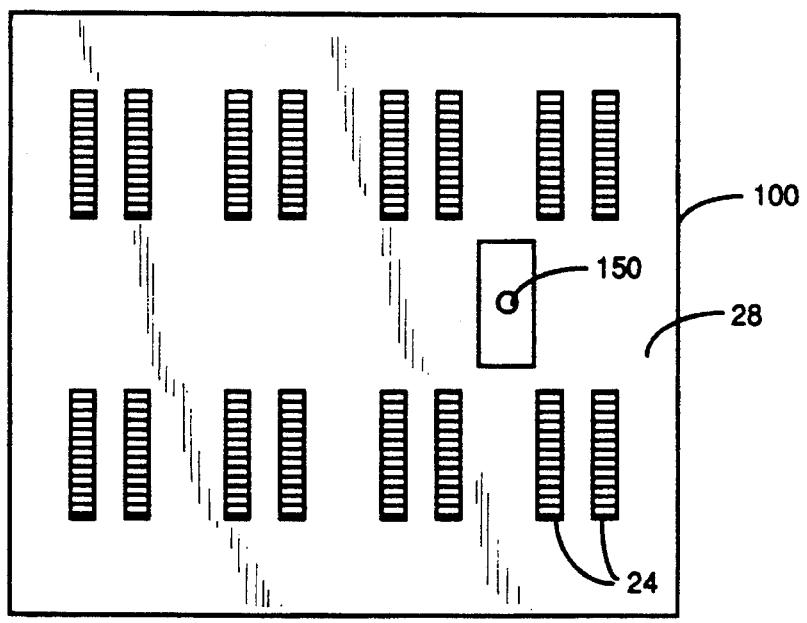
FIG. 4a is a rear view of a switching device having a mechanical interlock, indicating that the device is closed, for disabling closing of an associated switching device.

Referring to FIG. 4a, a rear view of switching device 100 is illustrated. Rear surface 28 of the exemplary switching device 100 includes mechanical interlock pin 150 and eight sets of terminals 24. It being understood that each set of terminals 24 may include plural individual terminations. As understood by those skilled in the art, such plural terminations are numbered in accordance with the rated current carrying capacity of switching device 100. The terminals 24 include four sets of line terminals and four sets of load terminals for three power line phases and a neutral line. Whenever switching device 100 is closed, pin 150 protrudes through rear surface 28 to engage interlocking mechanism 160 (see FIG. 4b). The pin 150 is pushed and forced to protrude through the surface by a tapered end of a pusher rod (not shown) surrounded by an opening spring (not shown) within switching device 100. On the other hand, when switching device 100 is open, pin 150 is generally flush with rear surface 28 and interlocking mechanism 160 is not engaged.

Figure 4B:
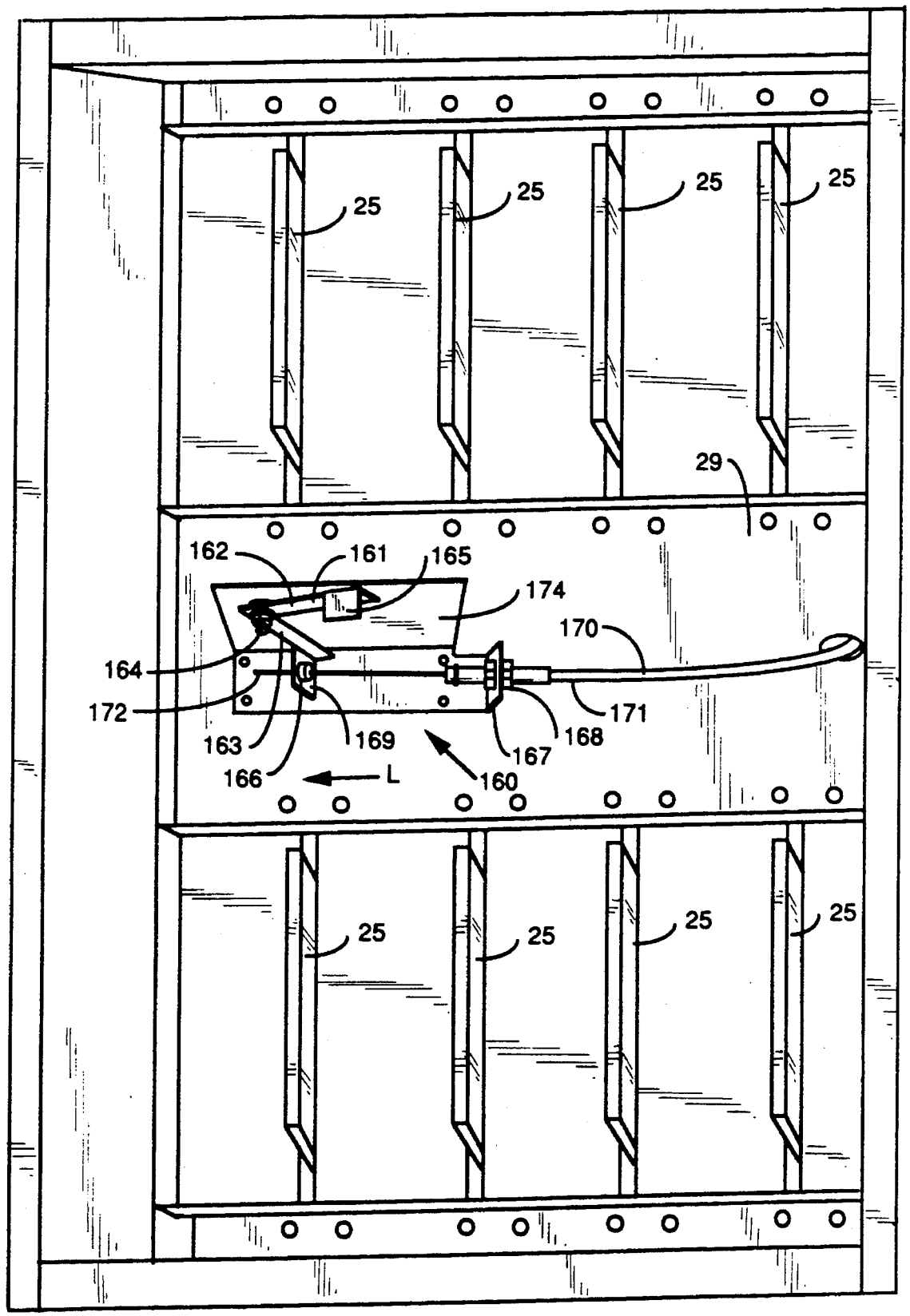
FIG. 4b is a perspective view, shown with the drawout switching device N of FIG. 2 removed, of an interlocking mechanism of switching device N, used with the mechanical interlock of FIG. 4a, for interlocking switching device E of FIG. 2.

FIG. 4b illustrates drawout cassette 22 with normal circuit interrupter N (see FIG. 2) removed. In the exemplary embodiment, rear surface 29 of the cassette includes eight terminals 25 and interlocking mechanism 160. The eight terminals 25 are interconnected with the corresponding eight sets of terminals 24 (see FIG. 4) when normal circuit interrupter N is installed (see FIG. 1). The interlocking mechanism 160 includes a mounting bracket 174 attached to the rear surface 29 of cassette 22. A generally L-shaped operating mechanism 162 is pivotally connected to mounting bracket 174 at pivot point 164. An engaging arm 161 and an operating arm 163 extend from pivot point 164. Engaging arm 161 has an engaging surface 165 for engaging pin 150 of normal circuit interrupter N (see FIG. 4a). Mounting bracket 174 also includes a mounting tab 167 having a hole 168 for mounting an interlocking cable 170. The cable has an outer sheath 171 and an inner operating wire 172. Operating wire 172 is connected to a connecting surface 169 of operating arm 163 by connection 166. Thus, for example, when normal circuit interrupter N (see FIG. 2) is closed, pin 150 (see FIG. 4a) protrudes and engages surface 165 which rotates engaging arm 161 and operating arm 163 about pivot point 164. In turn, operating arm 163 moves operating wire 172 left in direction L of FIG. 4b.

Figure 4C:
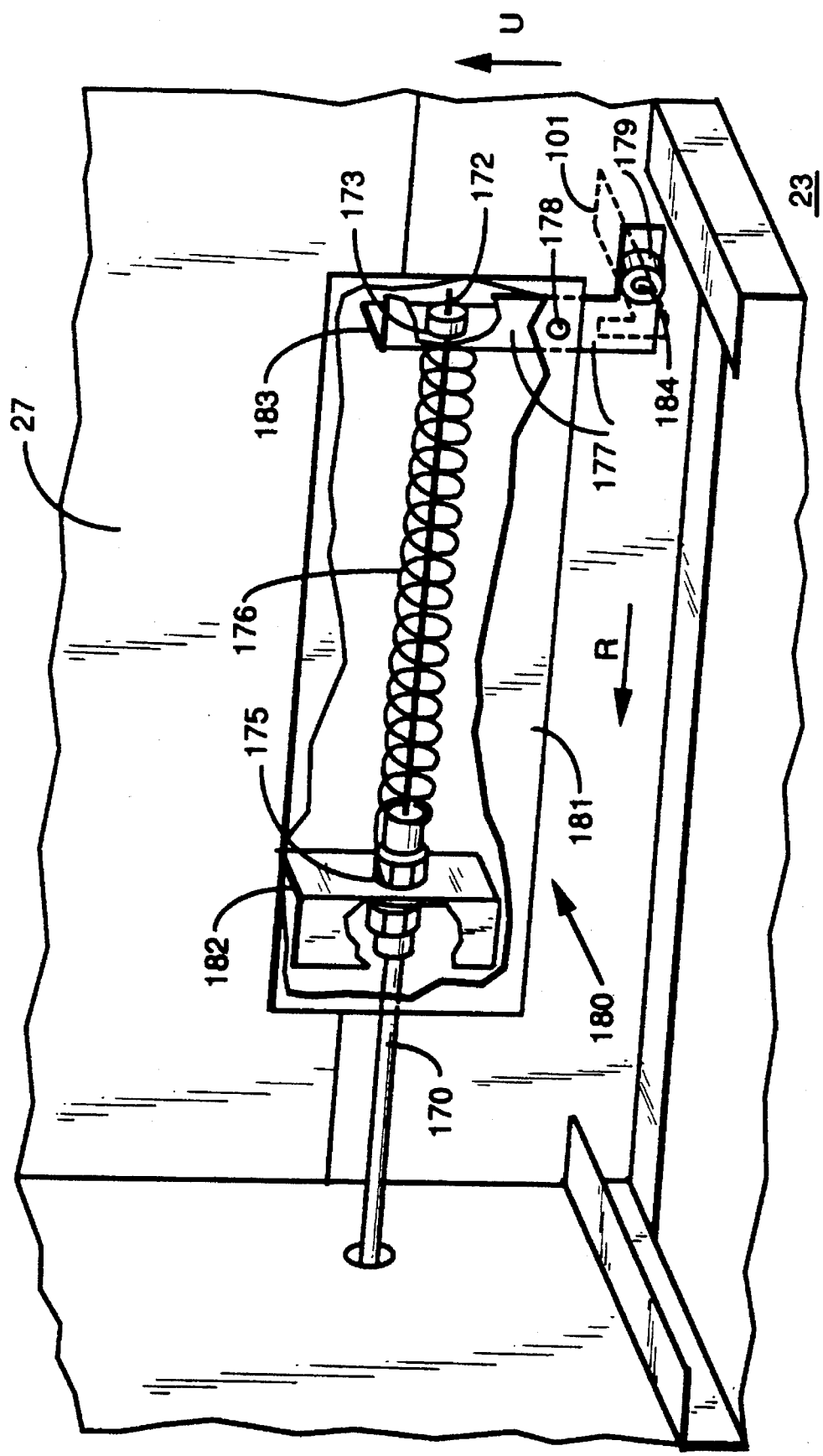
FIG. 4c is a perspective view, shown with the drawout switching device E of FIG. 2 removed, of an interlocking mechanism of switching device E, used with the mechanical interlock of FIG. 4 and actuated by the interlocking mechanism of switching device N of FIG. 4b.

FIG. 4c illustrates drawout cassette 23 with emergency circuit interrupter E (see FIG. 2) removed. An inside surface 27 of the cassette includes an interlocking mechanism 180 which cooperates with the interlocking mechanism 160 of FIG. 4b. The interlocking mechanism 180 is mounted to a plate 181 which is attached to inside surface 27 and includes interlocking cable 170, mounting tab 182, spring 176 and an L-shaped operating mechanism 177. In the exemplary embodiment described in FIGS. 4b–4c, interlocking cable 170 extends from normal circuit interrupter N to emergency circuit interrupter E. Mounting tab 182 has a hole 175 for mounting the interlocking cable 170. Operating mechanism 177 has an operating arm 183 and a roller 179 rotatably mounted to operating mechanism 177 at rotation point 184. The operating mechanism 177 is pivotally mounted to mounting plate 181 at pivot point 178. Operating wire 172 of cable 170 passes through spring 176 and is connected to operating arm 183 by connection 173. The spring 176 generally resists movement of operating arm 183 and operating wire 172, in rear direction R of FIG. 4c, except under influence of pin 150 (see FIG. 4a).

Thus, for example, when normal circuit interrupter N (see FIG. 2) is closed and one end of operating wire 172 moves in direction L of FIG. 4b, another end of operating wire 172 and operating arm 183 move in direction R of FIG. 4c. In turn, operating mechanism 177 rotates about pivot point 178 and roller 179 moves in a general upward direction U. Whenever roller 179 forces interlock 101 (see FIG. 4), shown in shadow in FIG. 4c, in upward direction U, latching of the circuit interrupter in a closed position is disabled. As discussed above, interlock 101 is mechanically biased to assume a lower position 103 (see FIG. 4) when either rod 254 (see FIG. 4) or roller 179 do not force the interlock in direction U.

In a like manner, interlocking mechanisms 160, 180 in circuit interrupters N,E operate to prevent closing circuit interrupter N whenever circuit interrupter E is closed. Similarly, the interlocking mechanisms in circuit interrupters BN,BE of bypass switch 30 prevent closing circuit interrupter BN whenever circuit interrupter BE is closed and, also, prevent closing circuit interrupter BE whenever circuit interrupter BN is closed.

Figure 5:
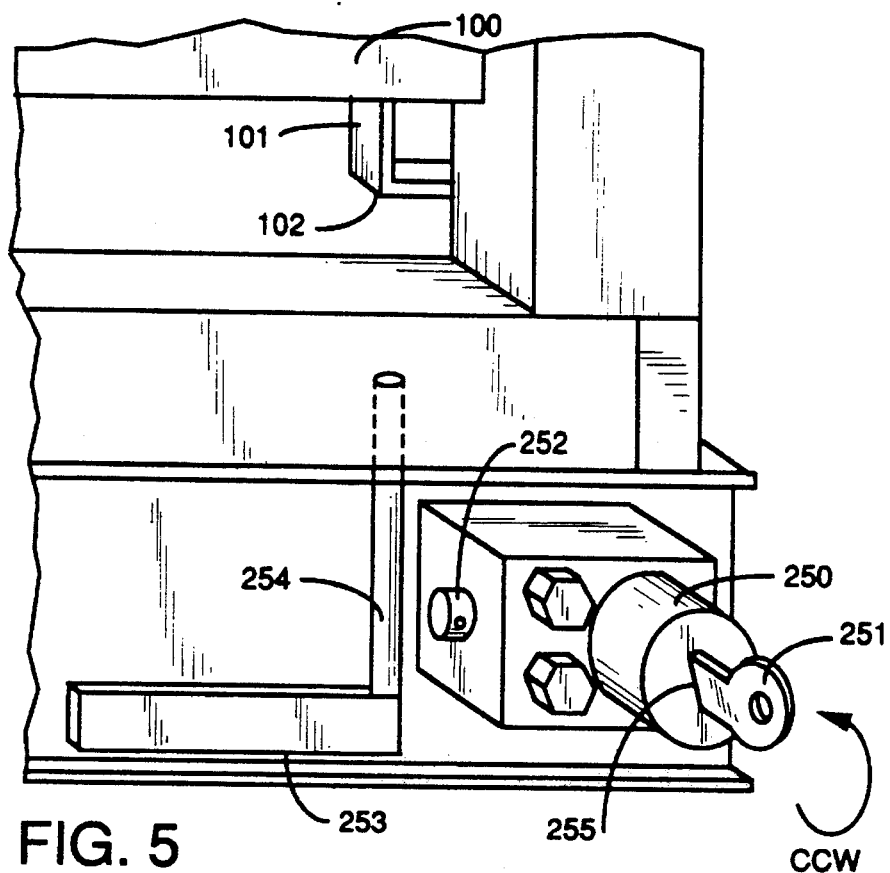
FIG. 5 is a perspective view of a keylock mechanism shown in an unlocked position.
Figure 5A:
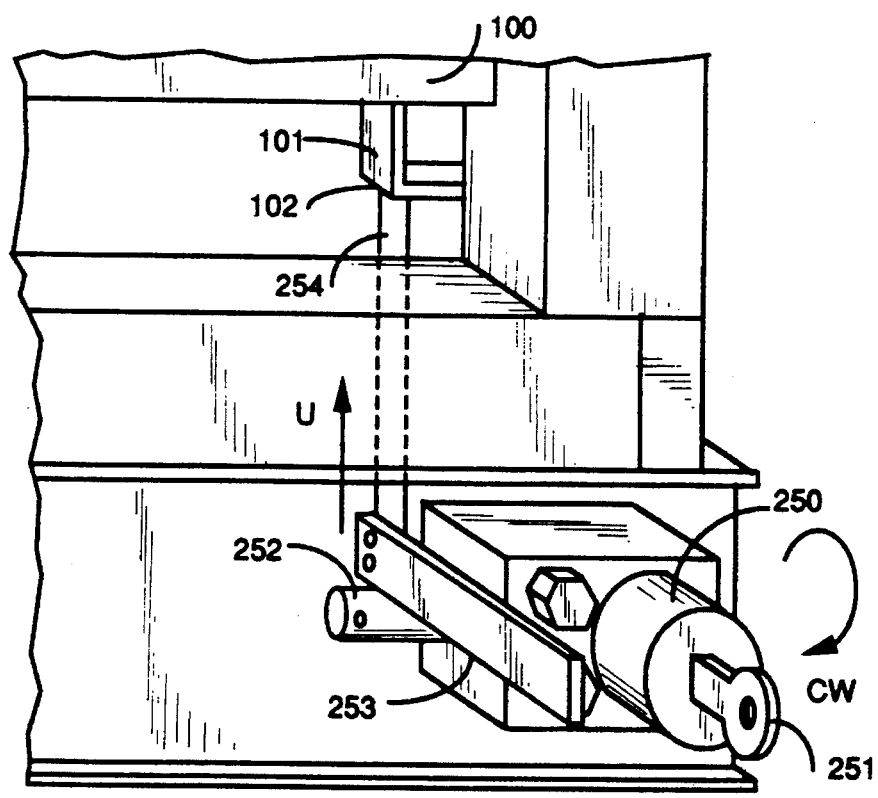
FIG. 5a is a perspective view of the keylock mechanism of FIG. 5, shown with a key in a locked position, used in conjunction with the mechanical interlock of FIG. 4.

Referring now to FIGS. 5–5a, keylock 250 is shown in an unlocked position in FIG. 5. The keylock 250 includes a key 251, a keyhole 255 for the key and a lock bolt 252. Whenever locking surface 253 is lifted above lock bolt 252 and key 251 is rotated in clockwise direction CW, then keylock 250 is locked and the lock bolt protrudes from the keylock to support the locking surface (see FIG. 5a). In this case, key 251 may be removed from the keylock. On the other hand, when key 251 is rotated in counter-clockwise direction CCW, keylock 250 is unlocked, lock bolt 252 retracts into the keylock, locking surface 253 falls below the lock bolt, and the key is retained and cannot be removed from the keylock.

The keylock 250 in FIG. 5a is shown with key 251 in the locked position. The lock bolt 252 protrudes from keylock 250 and supports locking surface 253 of vertical rod 254. The rod 254 engages interlock 101 near bend 102. In this position, as discussed above, rod 254 forces interlock 101 in upward direction U and switching device 100 cannot be closed. Whenever key 251 is turned in counter-clockwise direction CCW (see FIG. 5), lock bolt 252 retracts into keylock 250, no support is provided for locking surface 253 of vertical rod 254, and rod 254 disengages interlock 101. In this position (see FIG. 5), as discussed above, switching device 100 may be closed.

Figure 6:
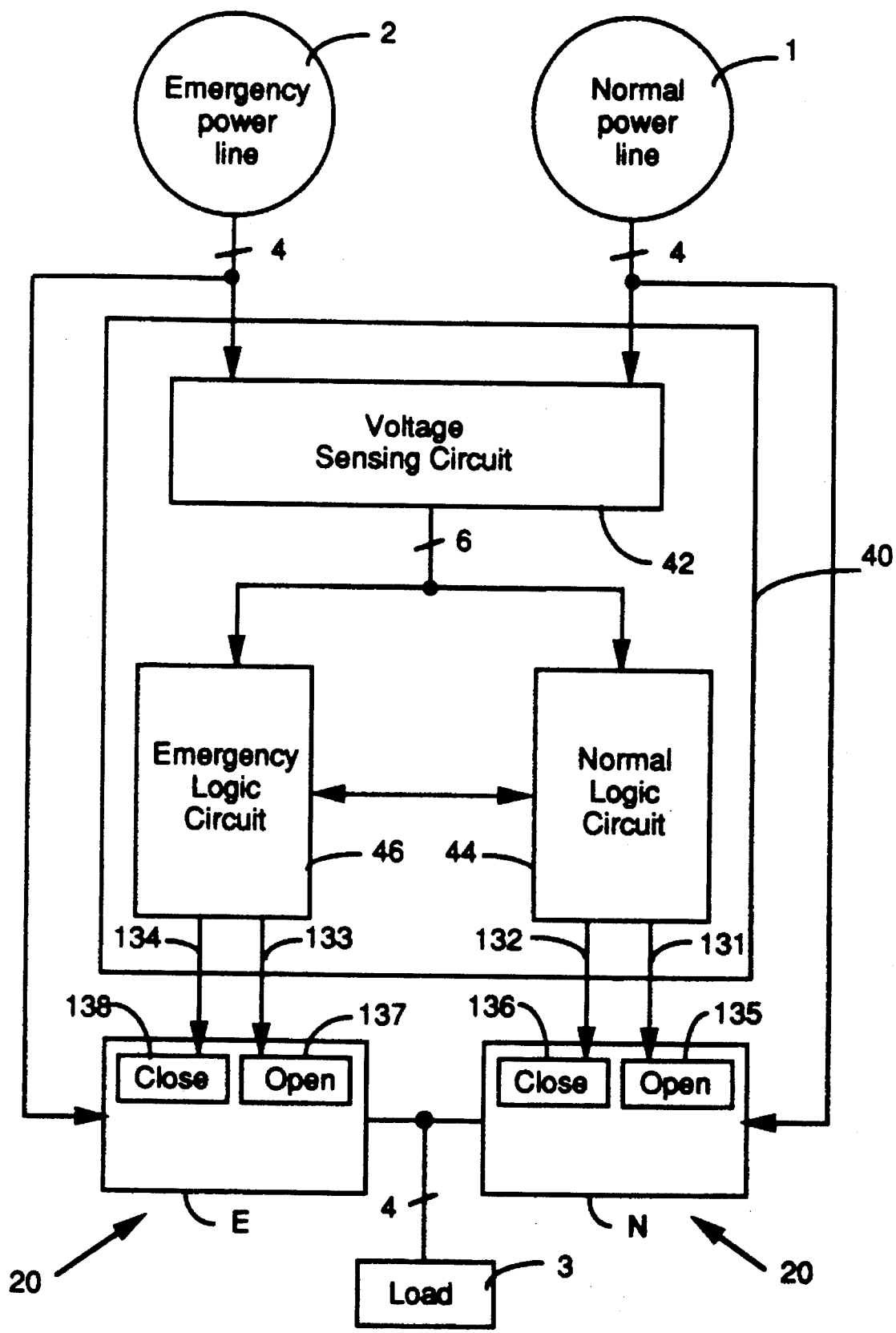
FIG. 6 is a block diagram of automatic transfer circuitry used in conjunction with two of the switching devices of FIG. 2.

Referring now to FIG. 6, a system including normal power line 1, emergency power line 2, normal circuit breaker N, emergency circuit breaker E and ATC 40 is illustrated. The ATC 40 includes a voltage sensing circuit 42 for detecting an undervoltage condition of the power lines 1,2, a normal power logic circuit 44 for normal circuit breaker N and an emergency power logic circuit 46 for emergency circuit breaker E. The ATC 40 may also include ancillary power circuitry (not shown) for powering indicators (not shown) of the circuit breakers of transfer switch 20 and bypass switch 30 whenever the circuit breakers are isolated for test purposes. The voltage sensing circuit 42 provides six signals, representative of an undervoltage condition of the three phases of each of power lines 1,2 to the logic circuits 44,46. Leads 131–134 connect electrical signals from ATC 40 to circuit breakers N,E to open and close each circuit breaker. Logic circuit 44 provides open 135 and close 136 signals on leads 131 and 132, respectively, to normal circuit breaker N. Similarly, logic circuit 46 provides open 137 and close 138 signals on leads 133 and 134, respectively, to emergency circuit breaker E.

Each of the close signals 136 and 138 are received by an electrical solenoid device having a closing coil (not shown) in each of the circuit breakers N and E, respectively. The closing coil rotates a latch (not shown) which releases energy stored in the switching mechanism, which is charged by charging handle 129 (see FIG. 4), in order to close the circuit breaker. Each of the open signals 135 and 137 are received by an electromechanical shunt trip or opening coil (not shown) in each of the circuit breakers N and E, respectively. The opening coil rotates the trip bar or lever which releases a toggle lever (not shown) in order to open the circuit breaker.

Whenever any of the three voltages of normal power line 1 are determined by voltage sensing circuit 42 to have a voltage less than a first predetermined value, and the three voltages of emergency power line 2 are determined by voltage sensing circuit 42 to have a voltage greater than a second predetermined value, then, after a first predetermined delay, logic circuit 44 outputs open signal 135 and logic circuit 46, after a break before make delay, outputs close signal 138. In the exemplary embodiment, the predetermined values are generally set at 70% and 90% of rated line voltage, respectively, using potentiometers (not shown) in voltage sensing circuit 42.

On the other hand, when the three voltages of normal power line 1 are determined by voltage sensing circuit 42 to have a voltage greater than the second predetermined value, then independent of the voltages of emergency power line 2 and after a second predetermined delay, logic circuit 46 outputs open signal 137 and logic circuit 44, after a break before make delay, outputs close signal 136. In the exemplary embodiment, the predetermined delays range from 1–60 seconds and 0.2–30 minutes, respectively.

Referring again to FIGS. 1, 2 and 5*b*, in order to bypass normal power line 1 to load 3, prevent connection of emergency power line 2 to load 3, and isolate normal circuit interrupter N from power line 1, an operator of system 10 would: (1) lift locking surface 253 and turn key 261 to lock locking mechanism K2A; (2) remove key 261 from lock K2A; (3) insert key 261 in lock K2B; (4) turn key 261 to unlock locking mechanism K2B; (5) close bypass normal circuit interrupter BN; and (6) open and drawout normal circuit interrupter N.

Subsequently, in order to selectively disconnect normal power line 1 from load 3, and to connect emergency power line 2 to load 3: the operator would: (7) open bypass normal circuit interrupter BN; (8) lift locking surface 253 and turn key 261 to lock locking mechanism K2B; (9) lift locking surface 253 and turn key 251 to lock locking mechanism K1A; (10) remove key 251 from lock K1A; (11) insert key 251 in lock K1B; (12) turn key 251 to unlock locking mechanism K1B; and (13) close bypass emergency circuit interrupter BE.

Alternatively, in order to selectively disconnect normal power line 1 from load 3, and to connect emergency power line 2 to load 3: the operator would: (7) open bypass normal circuit interrupter BN; (8) lift locking surface 253 and turn key 261 to lock locking mechanism K2B; (9) lift locking surface 253 and turn key 251 to lock locking mechanism K1A; (10) remove key 261 from lock K2B; (11) insert key 261 in lock K2A; (12) turn key 261 to unlock locking mechanism K2A; and (13) close emergency circuit interrupter E.

In order to selectively connect, independent of ATC 40, emergency power line 2 to load 3 and to prevent reconnection of normal power line 1 to load 3, an operator of system 10, which has locks K1A and K2A unlocked, would: (1) open normal circuit interrupter N; (2) lift locking surface 253 and turn key 251 to lock locking mechanism K1A; (3) remove key 251 from lock K1A; (4) insert key 251 in lock K1B; (5) turn key 251 to unlock locking mechanism K1B; and (6) close bypass emergency circuit interrupter BE. Alternatively, the operator would: repeat (1) through (5); and (6) close emergency circuit interrupter E.

Subsequently, in order to selectively disconnect emergency power line 2 from load 3, and to reconnect normal power line 1 to load 3, the operator would: (7) open bypass emergency circuit interrupter BE; (8) lift locking surface 253 and turn key 251 to lock locking mechanism K1B; (9) lift locking surface 253 and turn key 261 to lock locking mechanism K2A; (10) remove key 261 from lock K2A; (11) insert key 261 in lock K2B; (12) turn key 261 to unlock locking mechanism K2B; and (13) close bypass normal circuit interrupter BN. Those skilled in the art will recognize that other methods of selectively connecting and disconnecting the circuit interrupters are possible.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. Apparatus for selectively connecting a normal source of power or a emergency source of power to a load, comprising:

normal switch means operable between an opened and closed disposition interconnected with said normal source of power and said load for normally supplying power to said load from said normal source of power;

normal key lock means and complementary key means for said normal switch means for locking said normal switch means opened when said complementary key means is in a predetermined disposition in said normal key lock means, said complementary key means being removable from said normal key lock means only when said normal key lock means is in said latter predetermined disposition;

emergency switch means operable between an opened and closed disposition interconnected with said emergency source of power and said load for supplying power to said load from said emergency source of power under predetermined conditions;

emergency bypass switch means for electrically bypassing said emergency switch means and operable between an opened and closed disposition interconnected with said emergency source of power and said load for bypassing said emergency switch means and supplying power to said load from said emergency source of power; and emergency bypass key lock means for said emergency bypass switch means for being controlled by said complementary key means for allowing said emergency bypass switch means to be closed only when said complementary key means is in a predetermined disposition in said emergency bypass key lock means, said complementary key means not being removable from said emergency bypass key lock means when said emergency bypass key lock means is in said latter predetermined disposition.

2. The apparatus as claimed in claim 1, comprising:

normal bypass switch means for electrically by passing said normal switch means and operable between an opened and closed disposition and interconnected with said normal source of power and said load, for bypassing said normal switch means and supplying power to said load from said normal source of power.

3. The apparatus as claimed in claim 1, wherein said bypass switch means is closed.

4. Apparatus for selectively connecting a first source of power or a second Source of power to a load, comprising:

first switch means operable between an opened and closed disposition interconnected with said first source of power and said load for supplying power to said load from said first source of power;

a first key lock means and complementary key means for said first switch means for locking said first switch means opened when said complementary key means is in a predetermined disposition in said first key lock means, said complementary key means being removable from said first key lock means only when said first key lock means is in said latter predetermined disposition;

second switch means operable between an opened and closed disposition interconnected with said second source of power and said load for supplying power to said load from said second source of power under predetermined conditions;

second bypass switch means for electrically bypassing said second switch means and operable between an opened and closed disposition interconnected with said second source of power and said load for bypassing said second switch means and supplying power to said load from said second source of power; and a second bypass key lock means for said second bypass switch means for being controlled by said complementary key means for allowing said second bypass switch means to be closed only when said complementary key means is in a predetermined disposition in said second bypass key lock means, said complementary key means not being removable from said second bypass key lock means when said second bypass key lock means is in said latter predetermined disposition.

5. The apparatus as claimed in claim 4, comprising:

first bypass switch means for electrically by passing said first switch means and operable between an opened and closed disposition and interconnected with said first source of power and said load, for bypassing said first switch means and supplying power to said load from said first source of power.

6. The apparatus as claimed in claim 4, wherein said bypass switch means is closed.

* * * * *